Patented Mar. 2, 1937

2,072,146

UNITED STATES PATENT OFFICE

2,072,146

ABRASIVE ARTICLE AND METHOD OF MANUFACTURING THE SAME

Charles E. Wooddell, Frederick A. Upper, and Charles S. Nelson, Niagara Falls, N. Y., assignors, by mesne assignments, to The Carborundum Company, Niagara Falls, N. Y., a corporation of Delaware No Drawing. Application September 23, 1935
Serial No. 41,684

10 Claims. (Cl. 51—278)

This invention relates to improved abrasive articles and methods of manufacturing the same. More specifically, the invention is concerned with rubber bonded abrasive articles wherein the abrasive grains are preliminarily coated with an adhesive and are subsequently bonded with rubber.

Abrasive articles have long been made by milling or rolling abrasive grains into a vulcanizable rubber compound such as may be prepared by repeatedly rolling together the crude rubber of commerce and sulphur, usually along with various fillers such as carbon black, zinc oxide and the like. Such abrasive articles are of limited use, however, because of certain unavoidable limitations in the combination of physical properties that can be obtained. They are inherently dense because they consist of a continuous mass of rubber in which the abrasive grains are embedded and are consequently both slow and hot cutting.

With the advent of rubber dispersions such as natural rubber latex and artificial dispersions of rubber in water, numerous patents were taken out to methods of manufacturing rubber bonded abrasive articles wherein these dispersions were employed. Some of these methods have been commercially successful, but their use has been somewhat limited by reason of the fact that there is practically no adhesion between abrasive grains and vulcanized rubber. Consequently, if an open, porous type of article is made, as for example by pressing an article from a mass of rubber-coated abrasive grains prepared by a method described and claimed in U. S. Patent No. 1,976,798, exceedingly high unit pressures must be used in order to make an article which will be strong enough to withstand the stresses set up by the rotation of the wheel.

The application of such high pressures requires the installation of special presses for use on the manufacture of large diameter wheels, with consequent increase in the cost of producing the wheels. Furthermore, the increase in density resulting from such high pressures is accompanied by a decrease in the porosity of the finished articles and the cool and free-cutting characteristics which are the principal advantages of articles made from dispersions are correspondingly reduced in degree.

It is accordingly an object of the present invention to produce a rubber bonded abrasive article which shall be open and free and cool-cutting and will yet be sufficiently strong so that it can be operated at the speeds required for efficient operation of wheels of this type. Another object of the invention is the provision of an improved method for manufacturing rubber bonded abrasive articles. Still another object of the invention is to provide a method for manufacturing rubber bonded abrasive articles wherein there is a substantial degree of adhesion between the abrasive grains and the rubber bond. Other objects will appear from a further consideration of this specification and description of the invention.

In the broader sense the method of our invention comprises two steps; namely, a preliminary coating of the grain with a material which appears to be adhesive to both abrasive grains and vulcanized rubber, and subsequent bonding of the thus-coated grains into a composite article with vulcanized rubber. For convenience in describing the invention, we have chosen to call the two materials used in these two steps the "coating material" and the "bond" respectively.

The coating material which we have found to be satisfactory for the purposes indicated comprises, in general, a mixture of a synthetic resin and a product obtained by heating crude rubber until it "melts" or decomposes into a condition such that it is liquid at ordinary temperatures. This liquid decomposition product of rubber we call "decomposed rubber" and wherever the term "decomposed rubber" appears in the specification or claims it is intended to mean this liquid product obtained by heating rubber under certain conditions as will now be explained.

In preparing decomposed rubber we have found it convenient to employ an iron kettle with a loosely fitting cover into which we put pieces of crude rubber such as smoked sheet rubber or pale crepe rubber, cut into pieces about 2 inches square and the thickness of sheet as they are provided in commerce (about $\frac{3}{32}$" thick).

Having charged the kettle with a quantity of the pieces of rubber we apply heat to the bottom of the kettle as, for example, by a gas flame. We continue to heat the kettle until the rubber starts to melt and slumps to the bottom whereupon we reduce the heat to a point so as to maintain a temperature of about 400–450° F. or thereabouts. We have not found that the temperature of the treatment is critical as the process is not especially sensitive to variations in temperature.

When a temperature of 400–450° F. is employed we maintain this temperature for about three hours more or less at which time we withdraw about ¾ of the liquid, leaving a sufficient quantity to wet additional pieces of rubber and effect a transfer of heat, and we then add a further quantity of the crude rubber pieces and continue heating. Additional liquid may be withdrawn and replaced by crude rubber periodically from then on at intervals determined by examination of the liquid. The frequency of withdrawal depends upon a number of factors including the proportion withdrawn, the temperature maintained, the size of the particles, the size and shape of the kettle and the size of charge employed.

The determination of the length of treatment is comparatively simple and can be readily made from observation and examination of the liquid, the properties of which are described in the following paragraph. When a schedule of temperatures and quantity of material added and withdrawn has once been worked out for a given piece of apparatus, results can be readily duplicated.

The product obtained by the treatment, which we call "decomposed-rubber" is a dark brown liquid of rather tacky or sticky consistency and having a viscosity of about 850 seconds Stormer at 204° F. It has a characteristic odor by which it may be readily identified. Its specific gravity is approximately .92 as compared to water. It is soluble in common rubber solvents such as benzol, gasoline and carbon tetrachloride but is insoluble in alcohol and acetone. It thins somewhat upon heating without apparent change in composition or properties even after heating to 300° F. for 16 hours.

Decomposed-rubber appears to react with sulphur when heated to 300° F. for about 16 hours in proportions up to about 1 part sulphur to 2 parts of decomposed-rubber. The reaction product of 1 part sulphur and 2 parts decomposed-rubber is a material having something of the properties, in bulk, of soft rubber, but it has the unusual property of forming strong and stiff films on the surfaces of a mass of the reacted product which are jet black and glossy whereas the mass of the material is dull and greyish black in color.

When a mixture of 2 parts decomposed-rubber and 1 part of sulphur is heated in a test tube a stick of the reacted product is formed which is rubbery in the interior but the outer surfaces of the stick are brittle. There does not appear to be any difference between the upper surface, which has been exposed to air, and the other surfaces which were in contact with the glass of the test tube.

These films appear to be very adhesive, even to glass, as it is practically impossible to remove a stick of the reacted product from a test tube and if the tube is broken the glass is found to be tightly stuck to the sides of the stick. It is believed that it is this unusual property of forming hard tenacious films which is responsible for its unusual properties as a coating material in the manufacture of rubber bonded abrasive articles.

As stated above, we have found that highly satisfactory coating materials for use in the preparation of rubber bonded abrasive articles can be formed from mixtures of decomposed rubber and certain synthetic resins. For example, we have found that mixtures of decomposed rubber and an ordinary "A stage" heat hardenable phenol-formaldehyde condensation product in either liquid or solid condition form particularly valuable coating materials for the purpose described, although we have also successfully employed mixtures of decomposed rubber with a number of other resins including oil-modified phenolic resins, polymers of vinyl esters, and certain special vinyl resins formed by modifying vinyl ester polymers with certain aldehydes such as formaldehyde or acetaldehyde.

In carrying out the coating process we mix the abrasive grains with decomposed-rubber and synthetic resin and we usually find it desirable to subject the mixture to heat to partially harden the coating material as it is convenient to apply the coating material in liquid condition, and it is desirable to thicken the liquid or even convert it to a solid condition before the step of bonding the grains is begun.

The proportion of coating material to abrasive grains that is required in carrying out our invention is comparatively small as it appears that it is desirable to use only sufficient to form films around the individual grains. On the other hand the proportion does not appear to be critical as we have successfully used as little as one quarter of one per cent and as much as one per cent. In general, we have found that about one half of one per cent is satisfactory.

One composition and method of forming the coatings on abrasive grains which we have found to be satisfactory in carrying out this step of the process of our invention is as follows:—

Decomposed-rubber and a liquid heat-hardenable phenolic condensation product were mixed in equal parts and 5 parts of the mixture were mixed with 995 parts of #12 grit fused alumina until all the grains were moistened with the coating liquid.

The mass of coated grains was then put into a pan in a layer about 2 inches thick and heated in an oven at a temperature of 200° F. for 15 hours. At the end of this treatment the coatings had become very viscous and in fact almost solid, and were firmly attached to the individual grains.

In another modification of our invention, the mixture of decomposed-rubber and resin is given a heat treatment sufficient to substantially cure the resin, as for example, by heating for 300–320° F. for 16 hours. This type of treatment has the advantage that the films are hardened to an extent such that they will not be displaced if the abrasive grains are subjected to severe mechanical treatment, as sometimes happens with partially cured films.

Although we have found that grains coated with a mixture of decomposed-rubber and synthetic resin are useful in the manufacture of substantially all rubber bonded abrasives, it has been our experience that the method of our invention is particularly valuable when the bonding process is carried out in accordance with the method described and claimed in U. S. Patent No. 1,976,789, previously referred to.

An example of the application of this method to our invention is as follows:

Forty (40) grams of sulphur were mixed uniformly with 200 grams of an artificial dispersion of rubber in water containing 40% of previously-coagulated rubber dispersed with the aid of bentonite clay. This mixture of rubber dispersion and sulphur was then added to 872 grams of coated abrasive grains, consisting of #12 grit fused alumina prepared as described above and then moistened with 8 cubic centimeters of a 10% solution of lead acetate.

The mixture of grain, dispersion and sulphur was stirred for about a minute to insure uniform mixing and to allow the lead acetate to at least partially coagulate the rubber dispersion and then a paste consisting of 8 grams of magnesium oxide in 8 cc. of water was added and stirring was continued to distribute the magnesia through the mix.

This mixture was spread out in a pan in a layer an inch or two thick and air dried for 16 hours at the end of which time it was screened through a 6 mesh screen to break it up into individual rubber coated grains. The disintegrated mix was then dried in an oven at 150° F. until the water was substantially all removed whereupon it was again disintegrated into individual rubber coated grains and clusters of a few grains.

The mix was then warmed to about 180° F. to make it more readily distributable and was then put into a mold and pressed for 20 minutes at a pressure of 4,000 pounds per square inch between platens heated with steam under a pressure of 40 pounds per square inch gauge (285° F.).

The formed and partially cured article was then removed from the mold and cured in an oven at 300° F. for 16 hours.

Abrasive wheels prepared by the method just described have been found to be free and cool cutting and yet they are sufficiently strong to withstand rotation at 9,000 surface feet per minute with the usual factor of safety.

An alternative method of forming articles made in accordance with our invention comprises the preliminary steps of preparing a mass of coated grains to which are attached a vulcanizable rubber compound, as described in detail in the foregoing example, and then compacting these coated grains into a sheet by passing them between two equal speed rolls spaced apart a distance greater than the major dimension of any of the abrasive grains. By employing this method it is possible to produce articles which are somewhat denser than those made by a pressing process. It is in the production of these denser articles that we have found our grains coated with completely cured resin-decomposed rubber films to be especially advantageous.

As an example of the relative strengths of articles made from grains preliminarily coated in accordance with the method of our invention as compared to articles made by the same bonding process and of the same composition except for the coating material, we have found that articles made by our process are from one and one-half to two times as strong as articles made from uncoated grains. This marked improvement in strength permits the use of lower pressing pressures with consequent decrease in density and improvement in cutting rate, while at the same time the articles have a good abrading life and produce an unusually fine finish on work being ground.

Other work which we have done with mixtures of decomposed rubber and resins has led us to believe that improved films are formed if sulphur is provided to react with the decomposed rubber, and we sometimes add sulphur to the coating mixtures for this purpose. However, we have not found it to be necessary to do this, presumably because the sulphur in the rubber bond migrates when the coated grains are bonded to satisfy any requirements of the decomposed rubber.

Our invention has been found to be particularly well adapted for use in the manufacture of articles employing a rubber dispersion as a bond. However, we have found that grains coated in accordance with the method of our invention are also useful in the production of articles bonded with sheet rubber and to some extent in those bonded with other organic bond such as synthetic resins or shellac.

Therefore, while we have described our invention with particular reference to a specific method of bonding and a specific kind of bond, the invention is adapted for use with a wide variety of compositions and methods. For example, other types of abrasive grains may be substituted for the fused alumina used in the example and the size of the abrasive grains, the proportion of grain to coating material, the composition of the coating material, the type of crude rubber employed in making the decomposed rubber, the proportion of grains to rubber bond, the kind of bond, and the method of bonding may all be varied within the reasonable limits, all as set forth in the appended claims.

We claim:

1. The method of preparing abrasive grain for formation into bonded abrasive articles by means of organic binders which comprises heating crude rubber at about 400–450° F. to permanently liquefy the same by the action of the heat alone, mixing abrasive grains with a small proportion of the liquefied rubber and a small proportion of a synthetic resin whereby the abrasive grains are wetted with a mixture of the liquefied rubber and the resin, and partially curing the coating on the wetted grains by heat to form a distributable mass of individually coated grains.

2. The method of preparing abrasive grain for formation into bonded abrasive articles by means of organic binders which comprises heating crude rubber at about 400–450° F. to permanently liquefy the same by the action of the heat alone, mixing abrasive grains with a small proportion of the liquefied rubber and a small proportion of a normally liquid phenolic condensation product resin whereby the abrasive grains are wetted with a mixture of the liquefied rubber and the resin, and partially curing the coating on the wetted grains by heat to form a distributable mass of individually coated grains.

3. The method of preparing abrasive grain for formation into bonded abrasive articles by means of organic binders which comprises heating crude rubber at about 400–450° F. to permanently liquefy the same by the action of the heat alone, mixing abrasive grains with a small proportion of the liquefied rubber and a small proportion of a synthetic resin whereby the abrasive grains are wetted with a mixture of the liquefied rubber and the resin, and partially curing the coating on the wetted grains by heating to approximately 200° F. for about fifteen (15) hours to form a distributable mass of individually coated grains.

4. The method of preparing abrasive grain for formation into bonded abrasive articles by means of organic binders which comprises heating crude rubber at about 400–450° F. to permanently liquefy the same by the action of the heat alone, mixing abrasive grains with a small proportion of the liquefied rubber and a small proportion of a synthetic resin whereby the abrasive grains are wetted with a mixture of the liquefied rubber and the resin, and partially curing the coating on the wetted grains by heating to 300–320° F. for about sixteen (16) hours to form a distributable mass of individually coated grains.

5. Abrasive grain for use in the manufacture of organic bonded abrasive articles consisting of a loose mass of abrasive grains each encapsuled in a film comprising a heat-hardened mixture of crude rubber liquefied solely by heating at about 400–450° F. and a synthetic resin.

6. Abrasive grain for use in the manufacture of organic bonded abrasive articles consisting of a loose mass of abrasive grains each encapsuled in a film comprising a heat-hardened mixture of crude rubber liquefied solely by heating at about 400–450° F. and a normally liquid phenolic condensation product resin.

7. The method of preparing abrasive grain for formation into bonded articles by means of organic binders which comprises heating crude rubber to irreversibly liquefy it by the action of the heat alone, mixing abrasive grain and a small proportion of liquefied rubber and a small proportion of synthetic resin whereby the abrasive grains are wetted with a mixture of the liquefied rubber and the resin and partially curing the coating of the wetted grain to form a distributable mass of individually coated grains.

8. The method of preparing abrasive grain for formation into bonded abrasive articles by means of organic binders which comprises heating crude rubber to irreversibly liquefy it by the action of the heat alone, mixing abrasive grains with a small proportion of the liquefied rubber and a small proportion of a normally liquid phenolic condensation product resin whereby the abrasive grains are wetted with a mixture of the liquefied rubber and the resin and partially curing the coating of the wetted grain to form a distributable mass of individually coated grains.

9. Abrasive grain for the use in the manufacture of organic bonded abrasive articles consisting of a loose mass of abrasive grains each encapsuled in a film consisting of a heat-hardened mixture of a rubber derivative which was rendered irreversibly liquid by heat alone prior to hardening and a synthetic resin.

10. Abrasive grain for the use in the manuture of organic bonded abrasive articles consisting of a loose mass of abrasive grains each encapsuled in a film consisting of a heat-hardened mixture of a rubber derivative which was rendered irreversibly liquid by heat alone prior to hardening and a normally liquid phenolic condensation product resin.

CHARLES E. WOODDELL.
FREDERICK A. UPPER.
CHARLES S. NELSON.